(12) United States Patent
Sato

(10) Patent No.: US 7,407,334 B2
(45) Date of Patent: Aug. 5, 2008

(54) LENS FOR PHOTOGRAPHING SYSTEM AND CAMERA ASSEMBLY UTILIZING THE LENS

(75) Inventor: Makoto Sato, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 507 days.

(21) Appl. No.: 11/225,799

(22) Filed: Sep. 13, 2005

(65) Prior Publication Data

US 2006/0062569 A1    Mar. 23, 2006

(30) Foreign Application Priority Data

Sep. 17, 2004    (JP) .............................. 2004-270678

(51) Int. Cl.
G03B 17/00    (2006.01)

(52) U.S. Cl. .................. 396/439; 359/642; 359/754; 359/756

(58) Field of Classification Search ................. 396/439; 359/642, 658, 676, 754, 756
See application file for complete search history.

(56) References Cited

U.S. PATENT DOCUMENTS 5,760,958 A * 6/1998 Shibayama .................. 359/557

6,392,803 B2 * 5/2002 Osawa ......................... 359/495
2006/0061880 A1 * 3/2006 Kawakami .................. 359/754

FOREIGN PATENT DOCUMENTS

JP    2003-57542 A    2/2003

OTHER PUBLICATIONS

Related U.S. Appl. No. 11/225,800, filed Sep. 13, 2005; Inventor: Etsuro Kawakami; Title: Lens System Utilizing Light-Transmitting Ceramic and Camera Assembly Using Lens System Ultilizing Light-Transmitting Ceramic.

* cited by examiner

*Primary Examiner*—W. B. Perkey
*Assistant Examiner*—Warren K Fenwick
(74) *Attorney, Agent, or Firm*—Frishauf, Holtz, Goodman & Chick, PC

(57) ABSTRACT

In a lens group which is disposed forward of a photographing device and which includes at least a ceramic lens that is combined with a glass lens, wherein a conjugate surface of the photographing device by a combined surface between the ceramic lens and the glass lens is formed forward of the combined surface in an optical system that follows an optical system residing between the combined surface and the photographing device.

5 Claims, 3 Drawing Sheets

LENS FOR PHOTOGRAPHING SYSTEM AND CAMERA ASSEMBLY UTILIZING THE LENS

BACKGROUND OF THE INVENTION

1. Field of the Invention

The present invention relates to a small, high performance optical system lens group for use mainly in a small photographing unit such as a digital camera, and more particularly to a combination lens utilizing a ceramic lens.

2. Description of the Related Art

In these days, various small photographing units such as cameras and image scanners have been in use which use photographing devices such as two-dimensional CCD's.

Then, in recent years, in optical equipment such as digital still cameras, small and high performance zoom lenses have been in use.

In a combination lens such as a zoom lens for optical equipment, compactness and high resolution are required.

Due to this, the applicant of this patent application has filed a patent application for an invention for specifying combination conditions for a small and high performance zoom lens for digital still cameras which is an inexpensive combination lens with a small number of lenses which makes up a zoom lens (Japanese Unexamined Patent Publication No. 2003-057542).

In addition, in these days, light-transmitting ceramics have been developed. These light-transmitting ceramics have higher refractive indices than those of optical glass, and their hardness and flexural strength exhibit higher values than those of optical glass. This has allowed to produce lenses which are suitable for the tendency of making optical systems small in size and thin in thickness.

As has been described above, while photographing units using two-dimensional CCD's are small in size and high in resolution and hence make high quality photographing units, due to reflection of image forming light on the surface of a CCD, part of light that is incident on a photographing device is reflected, and the resulting reflected light from the photographing device is incident on a lens provided in front of the photographing device from the rear thereof as stray light. Then, the stray light so incident on the lens is reflected on the surface of the lens so as to be incident again on the photographing device.

Then, in the small photographing unit, a distance between the photographing device and the lens is small, and there sometimes exists a risk that a ghost image is produced on an image by the stray light.

In addition, since light-transmitting ceramics have the higher refractive indices and greater hardness and flexural strength, when used for lenses, the light-transmitting ceramics become optimal for use in making an optical system in optical equipment smaller in size.

In the light-transmitting ceramics, however, while the refractive indices and reflectance of optical glass range roughly from 1.5 to 1.8 and 4 percents to 8 percents, respectively, the light-transmitting ceramics have greater refractive indices. In a case where a light-transmitting ceramic whose refractive index is 2.08 is used as a ceramic lens, the resulting reflectance becomes about 12 percents, which is extremely greater than the reflectance of the optical glass, and hence there has existed a problem that reflected light from the CCD is reflected by the lens and the resulting reflected light returns to the CCD to impose a great effect on the production of a ghost image.

SUMMARY OF THE INVENTION

A lens system according to a preferred aspect of the invention includes a lens group which is disposed forward of a photographing device and which includes at least a ceramic lens that is combined with a glass lens, wherein a conjugate surface of the photographing device by a combined surface between the ceramic lens and the glass lens is formed forward of the combined surface in an optical system that follows an optical system residing between the combined surface and the photographing device.

In addition, a camera assembly according to the other preferred aspect of the invention includes a lens system which includes, in turn, a lens group disposed forward of a photographing device and including at least a ceramic lens that is combined with a glass lens, wherein a conjugate surface of the photographing device by a combined surface between the ceramic lens and the glass lens is formed forward of the combined surface in an optical system that follows an optical system residing between the combined surface and the photographing device.

The invention reduces the generation of a ghost image due to surface reflection on the ceramic lens having the high refractive index while using the ceramic lens.

DETAILED DESCRIPTION OF THE PREFERRED EMBODIMENT

A lens system according to the invention is a lens group that is used as a photographing lens of a CCD camera zoom lens and which acts as a convex lens as a whole.

This lens system makes up a zoom lens by being combined with a first lens group which acts as a concave lens and has two single lens elements and acts as a photographic lens that is made up of four single lens elements, and the lens system is such as to form an image on a photographing device in cooperation with the first lens group as an objective lens.

Figure 1:
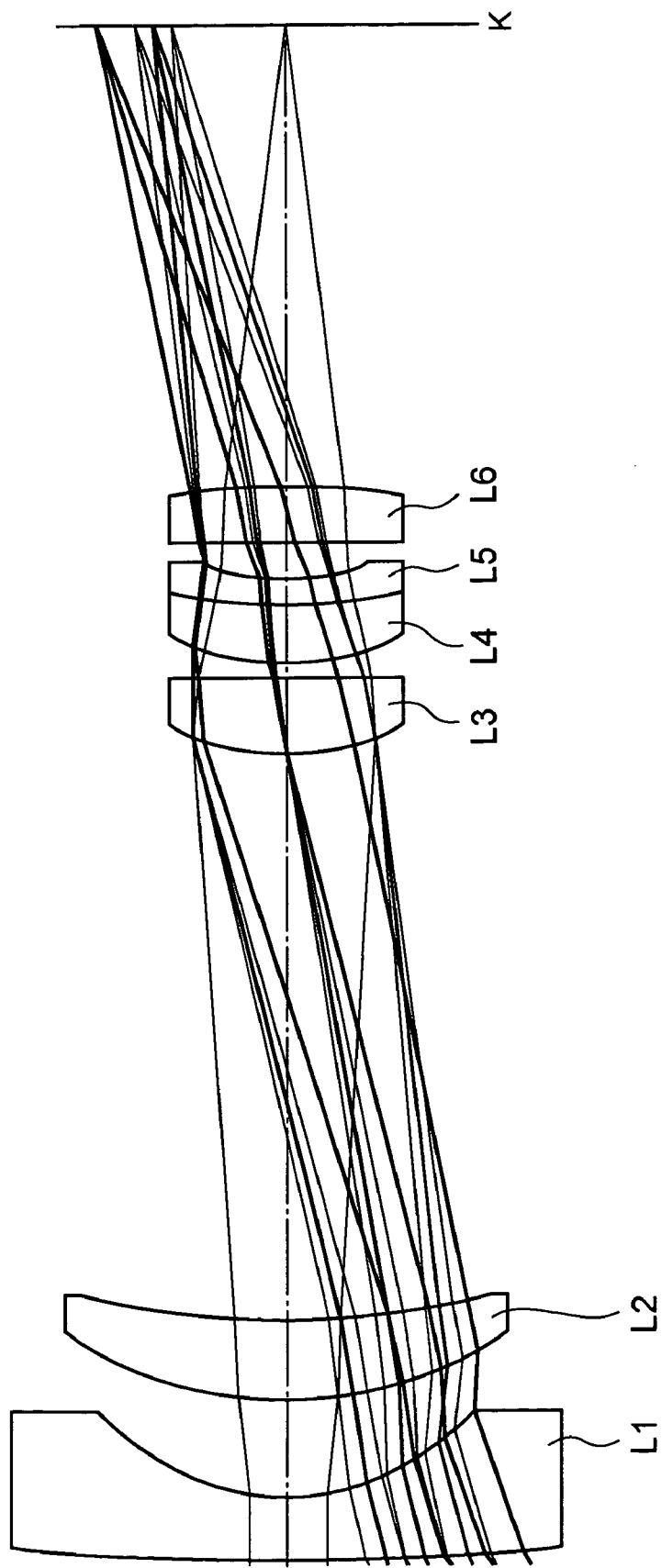
FIG. 1 is an exemplary diagram showing an image forming state by a zoom lens utilizing a lens system according to the invention.

Namely, the lens system according to the invention is a lens system as a second lens group that is used in a CCD camera zoom lens utilizing six lens elements and which acts as a convex lens as a whole. As shown in FIG. 1, a first lens element L1 and a second lens element L2, which make up of a first lens group acting as a concave lens, are disposed forward of a two-dimensional CCD that is provided at a position of a photographing surface K where the image of a photographing object is formed, and the lens system is disposed rearward of the first lens group.

This lens system constitutes the second lens group which acts as the photographic lens having the convex lens function in the zoom lens and is made up of four lens elements of third lens element L3 to sixth lens element L6, and the fifth lens element L5, which is a third lens element in the second lens group, is constituted by a ceramic lens made using a light-transmitting ceramic as a lens material.

Then, in this zoom lens, the first lens element L1 is made up of a negative meniscus lens which has a convex surface on a front side thereof and the second lens element L2 is made up of a positive meniscus lens which has a convex surface on a front side thereof, so that the first lens group is made to function as a concave lens having a negative refraction force on the whole. In addition, the third lens element L3 is made up of a convex lens having a surface with a small radius of curvature on a front side thereof, the fourth lens element L4 is made up of a positive meniscus lens which has a convex surface on a front side thereof, the fifth lens element L5 is made up of a negative meniscus lens that is to be used in such a state that it is joined to the fourth lens element L4, and the sixth lens element L6 is made up of a convex lens having a surface with a large radius of curvature on a front side thereof, whereby the second lens group is made to function as a convex lens having a positive refraction force on the whole.

Furthermore, in this zoom lens, with respect to dimensions along the direction of optical axis, assuming that the total length of the first lens group and the second lens group is TL, the composite focal length of the total lens system at a wide angle end is fw, and the composite focal length of the second lens group is f11, then, the following results:

$$TL/fw<1.9 \quad (1)$$

and, $$0.6<fw/f11<0.77 \quad (2),$$

and then, satisfying (1) can realize a small zoom lens, and satisfying (2) can satisfy the requirements for high resolution and small aberration for this zoom lens.

Then, in this the second lens group, a ceramic lens is used for the fifth lens element L5 in the second lens group whose thickness can be made thinnest.

As has been described above, since the fifth lens element L5, which is made up of the ceramic lens, is the negative meniscus lens having a convex surface on the front thereof, the surfaces of the fifth lens element L5 are both curved surfaces in which both the front refractive surface and the rear refractive surface protrude forward, and since the light-transmitting ceramic which is used as the material of the fifth lens element L5 has a great refractive index, the original reflectance of the lens becomes as great as about 12 percents, and hence there exists a risk that a ghost image is produced by stray light.

Due to this, in this embodiment, a reflection preventive treatment is applied to only a rear surface of the fifth lens element L5 so as to reduce the reflectance as low as possible, and on the front side of the fifth lens element L5 is combined tightly with the fourth lens element L4, the reflectance of a front refractive surface of a resulting composite lens is reduced down to about 2 percents, which is one sixth of the original reflectance.

Furthermore, while the lens system, which acts as the second lens group of the combined lens system, acts as a convex lens as whole, in order to reduce several aberrations, the lens system is made to include the third lens element L3 which is a convex lens having a positive refraction force, the fourth lens element L4 which is the positive meniscus lens having a positive refraction force, the fifth lens element L5 having a negative refraction force and the sixth lens element L6 which is a convex lens having a small positive refraction force, and even in the event that a stray light from the photographing surface is reflected rearward, when the resulting reflected light passes through the sixth lens element L6 to return to the photographing surface, the reflected light is converted into a diffused light so as to reduce the amount of the light returning to the photographing surface to thereby prevent the generation of a ghost image.

Figure 2:
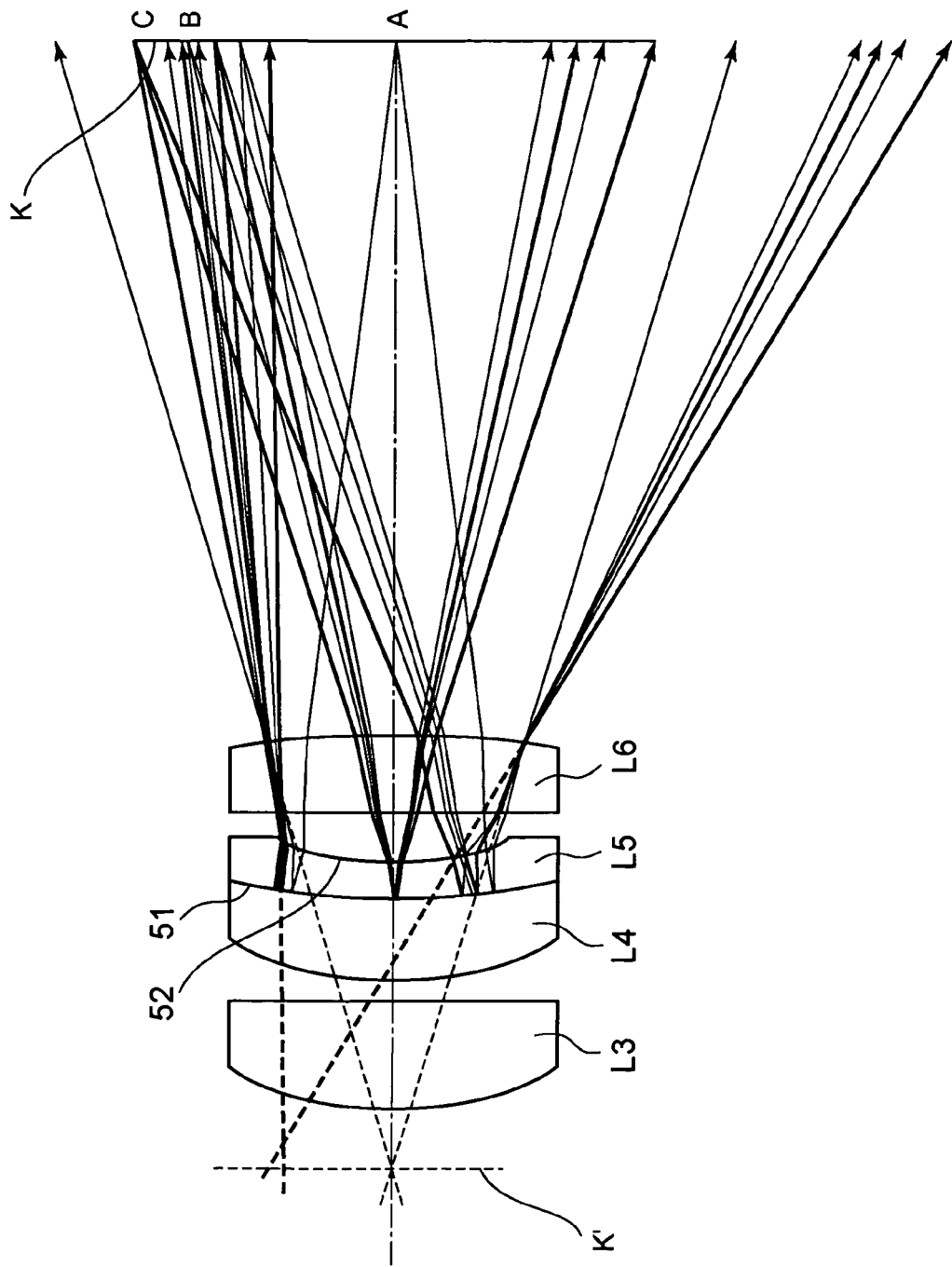
FIG. 2 is a diagram showing a state in which a stray light is reflected by the lens system according to the invention.

Namely, as to the reflection of stray light on the combined surface between the ceramic lens and the glass lens, as shown in FIG. 2, light emitted from a central point A on a photographing surface K and stray light that exits from a point B which is situated in the vicinity of a peripheral area of the photographing surface K and a peripheral point C are slightly subjected to a converging action at the sixth lens element L6. However, when those lights are incident on the fifth lens element L5 from a rear surface 52 thereof, the lights are subjected to a diverging or diffusing action. In addition, while the lights are subjected to a slight converging action when they are reflected on a front surface 51 of the fifth lens element L5, the lights are again subjected to a diffusing action when they exit from the rear surface 52 of the fifth lens element L5, and the lights that have passed through the sixth lens element L6 to return to the photographing surface K return to the photographing surface K as the diffused lights emitted from a conjugate surface K' which is forward of the front surface 51 of the fifth lens element L5.

Thus, by joining the front surface 51 of the fifth lens element L5 with the fourth lens element L4 to thereby reduce the reflectance on the front refractive surface of the fifth lens element L5 and forming the conjugate surface K' of the surface of the photographing device forward of the reflecting surface, the stray light emitted from the photographing surface K and then returning to the photographing surface K is converted into the diffused light so as to diffuse the stray light that is to be incident on the photographing device, whereby the generation of a ghost image by reflected light can be prevented while saving a reflection preventive treatment.

Note that the rear surface of the fifth lens element L5 that is not joined to the glass lens is given the reflection preventive treatment to eliminate almost all reflected light so as to prevent the generation of a ghost image by the reflected light.

Assuming:
fw; composite focal length of the whole lens system at wide angle end,
f1; focal length of the first lens element,
v1; Abbe number for the first lens element,
v2; Abbe number for the second lens element,
n2; refractive index on d line of the second lens element,
R2; radius of curvature on a rear surface of the first lens element,
the following results:

$$-1.1<fw/f1<-0.8$$

$$10<v1-v2$$

$$1.66<n2$$

$$1.16<fw/R2<1.51$$

and, power was appropriately distributed to the first lens group which has the negative refraction force, whereby the enlargement of the whole optical system was prevented and balancing several aberrations was facilitated.

In addition, assuming:
v3; Abbe number for the third lens element,
v4; Abbe number for the fourth lens element,
v5; Abbe number for the fifth lens element,
n3; refractive index on d line of the third lens element,
n4; refractive index on d line of the fourth lens element,
f3; focal length of the third lens element;

R5; radius of curvature on a front surface of the third lens element,

R9; radius of curvature on a rear surface of the fifth lens element, the following results:

$$29.7 < (v3+v4)/2 - v5$$

$$1.45 < (n3+n4)/2 < 1.78$$

$$0.5 < fw/f3 < 0.85$$

$$0.8 < fw/R5 < 1.45$$

$$0.75 < R5/R9 < 1.45,$$

whereby an optical system was obtained in which there were few aberrations.

Then, a light-transmitting ceramic having a refractive index n of 2.08165 on the d line was used for the fifth lens element L5, and optical glasses having the following refractive indices on the d line n1=1.80025 m n2=1.84666, n3=1.56907, n4=1.62041 and n6=1.67407 were used for the other lens elements such as the first lens element L1 to the fourth lens element L4 and the sixth lens element L6, respectively.

Furthermore, when combining the fourth lens element L4 with the fifth lens element L5, an adhesive was used which had a refractive index on the d line of 1.54.

In addition, the Abbe v5 number of the light-transmitting ceramic which made up the ceramic lens was 30.288, and the Abbe numbers of the optical glasses which made up the other lens elements such as the first lent element L1 to the fourth lens element L4 and the six lens element L6 were v1=40.8, v2=27.785, v3=71.315, v4=60.344, v6=55.

Then, a reflection preventive treatment was applied to the rear surface of the fifth lens element L5 to reduce the refractive index on the d line thereof down to 0.8 percents or lower.

Note that specific numerical examples of this zoom lens are shown in Table 1.

In the table, f denotes a focal length of the whole lens system, $F_{NO}$ F numbers, 2ω total angle of view of lens and $b_f$ back-focal distance. The back-focal distance $b_f$ is an air converted distance of a distance from the rear surface of the sixth lens element which makes up the second lens group to the image plane. In addition, R denotes radius of curvature, D lens thickness or lens space, nd refractive index of d line and $v_d$ Abbe number of d line.

TABLE 1 f = 5.00~8.24~13.50
$F_{No}$ = 3.22~4.04~5.39
2ω = 64.3°~40.1°~24.8°
$b_f$ = 7.523~10.049~14.201

| Surface No. | R | D | $n_d$ | $v_d$ | |
|---|---|---|---|---|---|
| 1 | 47.8657 | 1.000 | 1.80025 | 40.8 | } First lens element |
| 2 | 3.6748 | 1.557 | | | |
| 3 | 6.6658 | 1.268 | 1.84666 | 23.785 | |
| 4 | 15.1935 | 9.180~3.900~0.725 | | | |
| 5 | 4.0754 | 1.264 | 1.56907 | 71.315 | } Second lens element |
| 6 | −34.1334 | 0.212 | | | |
| 7 | 4.1351 | 0.967 | 1.62041 | 60.344 | |
| 8 | 9.9538 | 0.400 | 2.08165 | 30.288 | |
| 9 | 3.1948 | 0.585 | | | |
| 10 | 66.3961 | 0.904 | 1.67407 | 55 | |
| 11 | −11.3711 | 7.523~10.049~14.201 | | | |

Aspheric coefficient

| Surface No. | K | $A_4$ | $A_6$ | $A_8$ | $A_{10}$ |
|---|---|---|---|---|---|
| 2 | −3.4886 | 7.3110E−03 | −4.7308E−04 | 3.2015E−05 | −1.0426E−06 |
| 5 | −1.096 | 0.0000E+00 | 2.5755E−04 | −7.7718E−05 | −1.0822E−07 |
| 6 | −13.769 | −7.7187E−04 | 3.4108E−04 | −1.4188E−04 | 7.4981E−06 |
| 11 | 8.00044 | 2.0569E−03 | 3.8219E−04 | −6.9746E−05 | 2.8466E−05 |

As a result, a digital still camera lens was obtained which is small in size and light in weight and which can form a high-quality image which is free of ghost images.

Figure 3A:
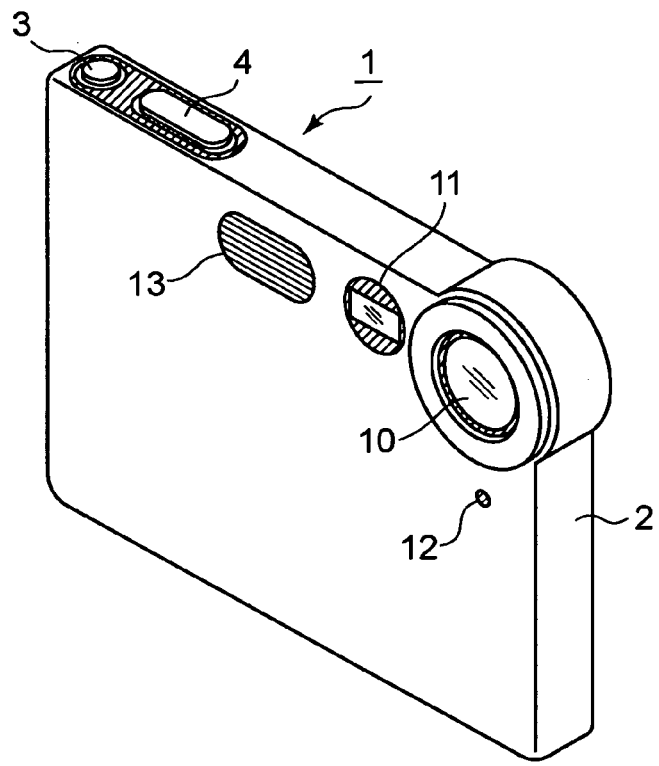
FIG. 3A is a front perspective view of a camera assembly utilizing the lens system according to the invention.
Figure 3B:
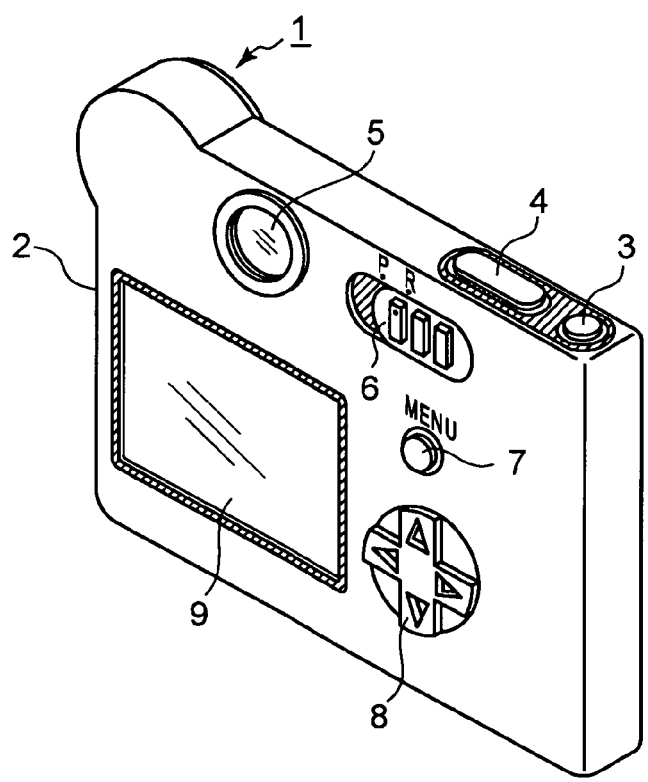
FIG. 3B is a rear perspective view of the camera assembly utilizing the lens system according to the invention.

Incidentally, the lens system according to the embodiment that has been described heretofore can be used in a camera assemble as shown in FIGS. 3A, 3B.

Next, FIGS. 3A and 3B show the external appearance of a digital camera 1 equipped with the lens system of the embodiment that has been described above, in which FIG. 3A is a perspective view as seen from a front upper side, and FIG. 3B is a perspective view as seen from a rear upper side. As shown in the figures, a power supply key 3 and a shutter release key 4 are disposed at rightward positions on an upper side of a camera main body of the digital camera 1 which camera main body is formed into a rectangular parallelepiped, flat plate-like box shape. The power supply key 3 is such as to turn on and off the power supply, and the shutter release key 4 is such as to implement a shutter releasing operation when activated in a recording mode and also functions as a selection/execution key when menu items denoting various operation modes are displayed.

In addition, disposed on the back of the digital camera 1 are an optical viewfinder eyepiece 5, a record (REC)/playback (PLAY) changeover switch 6, a menu key 7, a cursor key 8 with which displayed menu items are selected and a liquid-crystal monitor 9. The record/playback switch 6 is a switch for changing over modes between a record mode and a playback mode, and the menu key 7 is such as to have menu items of various operation modes displayed. The cursor key 8 is such as to move over the displayed menu items for selection, and the liquid-crystal monitor 9 is made up of, for example, a color liquid-crystal display panel with a back light and displays not only an object image (a through image) when waiting for photographing under the record mode but also a selected state such as an operation mode selected through the operation of the menu key 7.

Furthermore, disposed on the front side of the camera main body 2 are a photographic lens 10, an optical viewfinder window 11, a self-timer indication lamp 12 and a strobe light emitting portion 13. Then, in the embodiment of the invention, the photographic lens 10 is made up of the lens system including the aforesaid ceramic lens.

As a result, a digital still camera was obtained which is small in size and light in weight and which can form a high-quality image which is free of ghost images.

What is claimed is:

1. A lens system comprising:
a lens group which is disposed forward of a photographing device and which comprises at least a ceramic lens that is combined with a glass lens, wherein a conjugate surface of the photographing device by a combined surface between the ceramic lens and the glass lens is formed forward of the combined surface in an optical system that follows an optical system residing between the combined surface and the photographing device.

2. A lens system as set forth in claim 1, wherein
the conjugate surface is in the order of an optical system residing between the photographing device to the combined surface, a reflecting surface which is the combined surface between the ceramic lens and the glass lens and an optical system residing between the combined surface to the photographing device.

3. A lens system as set forth in claim 1, wherein a non-reflection coating or a reflection reducing coating is applied to a surface of the ceramic lens that does not constitute the combined surface.

4. A lens system as set forth in claim 2, wherein a non-reflection coating or a reflection reducing coating is applied to a surface of the ceramic lens that does not constitute the combined surface.

5. A camera assembly comprising:
a lens system which comprises, in turn, a lens group disposed forward of a photographing device and comprising at least a ceramic lens that is combined with a glass lens, wherein a conjugate surface of the photographing device by a combined surface between the ceramic lens and the glass lens is formed forward of the combined surface in an optical system that follows an optical system residing between the combined surface and the photographing device.

* * * * *